(12) United States Patent
Sullivan et al.

(10) Patent No.: US 8,659,399 B2
(45) Date of Patent: Feb. 25, 2014

(54) DEVICE CONTROL BY MULTIPLE REMOTE CONTROLS

(75) Inventors: Marc Sullivan, Austin, TX (US); Steven M. Belz, Cedar Park, TX (US); James Pratt, Round Rock, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 568 days.

(21) Appl. No.: 12/503,704

(22) Filed: Jul. 15, 2009

(65) Prior Publication Data

US 2011/0012710 A1 Jan. 20, 2011

(51) Int. Cl.
*G05B 11/01* (2006.01)

(52) U.S. Cl.
USPC .......... 340/12.22; 340/12.52; 340/12.53; 348/14.05; 725/38

(58) Field of Classification Search
USPC ............ 340/12.22, 12.52, 12.53; 348/14.05; 725/38
See application file for complete search history.

(56) References Cited

U.S. PATENT DOCUMENTS

| | | | |
|---|---|---|---|
| 4,638,433 A * | 1/1987 | Schindler | 700/90 |
| 5,937,065 A * | 8/1999 | Simon et al. | 380/262 |
| 6,163,271 A * | 12/2000 | Yoshizawa et al. | 340/5.26 |
| 6,484,027 B1 | 11/2002 | Mauney et al. | |
| 6,486,795 B1 * | 11/2002 | Sobel et al. | 340/13.21 |
| 6,865,372 B2 | 3/2005 | Mauney et al. | |
| 6,903,650 B2 * | 6/2005 | Murray | 340/5.23 |
| 7,010,169 B2 | 3/2006 | Kortum et al. | |
| 7,016,709 B2 | 3/2006 | Kortum et al. | |
| 7,180,260 B2 * | 2/2007 | Murphy et al. | 318/466 |
| 7,206,614 B2 | 4/2007 | Kortum et al. | |
| 7,251,373 B2 | 7/2007 | Kortum et al. | |
| D550,696 S | 9/2007 | Kortum et al. | |
| 7,307,574 B2 | 12/2007 | Kortum et al. | |
| D562,806 S | 2/2008 | Bruce et al. | |
| 7,337,220 B2 | 2/2008 | Kortum et al. | |
| 7,353,018 B2 | 4/2008 | Mauney et al. | |
| 7,366,337 B2 | 4/2008 | Kortum et al. | |
| 7,403,793 B2 | 7/2008 | Mauney et al. | |
| 7,406,207 B2 | 7/2008 | Kortum et al. | |
| 7,474,359 B2 | 1/2009 | Sullivan et al. | |
| 7,499,594 B2 | 3/2009 | Kortum et al. | |
| 7,512,228 B2 | 3/2009 | Kortum et al. | |
| 7,518,991 B2 | 4/2009 | Sullivan et al. | |
| 7,551,973 B2 | 6/2009 | Cansler, Jr. et al. | |
| 7,565,430 B2 | 7/2009 | Kortum et al. | |
| 7,602,898 B2 | 10/2009 | Klein et al. | |
| D603,842 S | 11/2009 | Bruce et al. | |
| 7,636,933 B2 | 12/2009 | Kortum et al. | |
| 7,693,542 B2 | 4/2010 | Mauney et al. | |
| 7,716,714 B2 | 5/2010 | Kortum et al. | |
| 7,720,255 B2 | 5/2010 | Rhoads | |
| 7,734,788 B2 | 6/2010 | Karaoguz et al. | |
| 7,774,384 B2 | 8/2010 | Kortum et al. | |

(Continued)

*Primary Examiner* — Jennifer Mehmood
(74) *Attorney, Agent, or Firm* — Jackson Walker L.L.P.

(57) ABSTRACT

A method and system for remotely controlling a remote-controlled device (RCD) includes receiving an instruction from a remote control (RC). The instruction may include an RC code and a control code. The RC code may identify the RC and the control code may identify an operation to be performed on the RCD. RC codes matching an authorized set of RC codes may cause the control code to be accepted, since the RC is authorized. If a non-matching RC code is received, the control code may be rejected as coming from a prohibited RC. An authorization mode on the RCD may allow modification of the authorized set of RC codes.

14 Claims, 3 Drawing Sheets

(56) References Cited

U.S. PATENT DOCUMENTS

| | | |
|---|---|---|
| 7,783,120 B2 | 8/2010 | Kortum et al. |
| 7,793,317 B2 | 9/2010 | Sullivan et al. |
| 7,836,196 B2 | 11/2010 | Karaoguz et al. |
| 7,873,102 B2 | 1/2011 | Van Vleck et al. |
| 7,876,232 B2 | 1/2011 | Sullivan et al. |
| 7,876,775 B2 | 1/2011 | Jones et al. |
| 7,885,684 B2 | 2/2011 | Mauney et al. |
| 7,894,682 B2 | 2/2011 | Kortum et al. |
| 7,949,305 B2 | 5/2011 | Sullivan et al. |
| 7,966,310 B2 | 6/2011 | Sullivan et al. |
| 2002/0037715 A1 | 3/2002 | Mauney et al. |
| 2002/0137460 A1* | 9/2002 | Sun et al. ............... 455/41 |
| 2003/0016119 A1* | 1/2003 | Teich ..................... 340/5.22 |
| 2003/0016139 A1* | 1/2003 | Teich ................... 340/825.22 |
| 2003/0023881 A1* | 1/2003 | Fitzgibbon et al. ......... 713/202 |
| 2003/0079028 A1 | 4/2003 | Kortum et al. |
| 2003/0194141 A1 | 10/2003 | Kortum et al. |
| 2003/0194142 A1 | 10/2003 | Kortum et al. |
| 2004/0116073 A1 | 6/2004 | Mauney et al. |
| 2004/0177279 A1* | 9/2004 | Domenz et al. ............. 713/202 |
| 2005/0020236 A1 | 1/2005 | Mauney et al. |
| 2005/0032475 A1 | 2/2005 | Mauney et al. |
| 2005/0076121 A1 | 4/2005 | Kortum et al. |
| 2005/0159107 A1 | 7/2005 | Mauney et al. |
| 2005/0166261 A1 | 7/2005 | Kortum et al. |
| 2005/0175230 A1 | 8/2005 | Kortum et al. |
| 2005/0180463 A1 | 8/2005 | Jones et al. |
| 2005/0180560 A1 | 8/2005 | Kortum et al. |
| 2005/0202854 A1 | 9/2005 | Kortum et al. |
| 2005/0216589 A1 | 9/2005 | Kortum et al. |
| 2006/0015924 A1 | 1/2006 | Kortum et al. |
| 2006/0026663 A1 | 2/2006 | Kortum et al. |
| 2006/0037043 A1 | 2/2006 | Kortum et al. |
| 2006/0037083 A1 | 2/2006 | Kortum et al. |
| 2006/0039547 A1 | 2/2006 | Klein et al. |
| 2006/0048178 A1 | 3/2006 | Kortum et al. |
| 2006/0048179 A1 | 3/2006 | Kortum et al. |
| 2006/0050865 A1 | 3/2006 | Kortum et al. |
| 2006/0087978 A1 | 4/2006 | Sullivan et al. |
| 2006/0098882 A1 | 5/2006 | Kortum et al. |
| 2006/0112094 A1 | 5/2006 | Sullivan et al. |
| 2006/0114360 A1 | 6/2006 | Kortum et al. |
| 2006/0116177 A1 | 6/2006 | Kortum et al. |
| 2006/0117374 A1 | 6/2006 | Kortum et al. |
| 2006/0123445 A1 | 6/2006 | Sullivan et al. |
| 2006/0126808 A1 | 6/2006 | Dallassendaro et al. |
| 2006/0156372 A1 | 7/2006 | Cansler, Jr. et al. |
| 2006/0159119 A1 | 7/2006 | Kortum et al. |
| 2006/0168610 A1 | 7/2006 | Noil Williams et al. |
| 2006/0170582 A1 | 8/2006 | Kortum et al. |
| 2006/0174279 A1 | 8/2006 | Sullivan et al. |
| 2006/0184992 A1 | 8/2006 | Kortum et al. |
| 2006/0187071 A1 | 8/2006 | Kortum et al. |
| 2006/0271516 A1 | 11/2006 | Kortum et al. |
| 2007/0011250 A1 | 1/2007 | Kortum et al. |
| 2007/0025449 A1 | 2/2007 | Van Vleck et al. |
| 2007/0039031 A1 | 2/2007 | Cansler, Jr. et al. |
| 2007/0039036 A1 | 2/2007 | Sullivan et al. |
| 2007/0044119 A1 | 2/2007 | Sullivan et al. |
| 2007/0056015 A1 | 3/2007 | Kortum et al. |
| 2007/0130588 A1 | 6/2007 | Edwards et al. |
| 2007/0143790 A1 | 6/2007 | Williams et al. |
| 2007/0169155 A1 | 7/2007 | Pasquale et al. |
| 2007/0174276 A1 | 7/2007 | Sullivan et al. |
| 2007/0177188 A1 | 8/2007 | Wollmershauser et al. |
| 2007/0180382 A1 | 8/2007 | Kortum et al. |
| 2007/0180489 A1 | 8/2007 | Joseph et al. |
| 2007/0192791 A1 | 8/2007 | Sullivan et al. |
| 2007/0248273 A1 | 10/2007 | Kortum et al. |
| 2007/0271342 A1 | 11/2007 | Brandt et al. |
| 2007/0294737 A1 | 12/2007 | Edwards et al. |
| 2008/0098308 A1 | 4/2008 | Kortum et al. |
| 2008/0100492 A1 | 5/2008 | Kortum et al. |
| 2008/0101338 A1 | 5/2008 | Reynolds et al. |
| 2008/0101588 A1 | 5/2008 | Bruce et al. |
| 2008/0104630 A1 | 5/2008 | Bruce et al. |
| 2008/0109839 A1 | 5/2008 | Bruce et al. |
| 2008/0125098 A1 | 5/2008 | Bruce et al. |
| 2008/0165283 A1 | 7/2008 | Brandt et al. |
| 2008/0187210 A1 | 8/2008 | Kortum et al. |
| 2008/0189736 A1 | 8/2008 | Edwards et al. |
| 2008/0235745 A1 | 9/2008 | Edwards et al. |
| 2008/0250468 A1 | 10/2008 | Sullivan et al. |
| 2008/0261514 A1 | 10/2008 | Pratt et al. |
| 2009/0010555 A1 | 1/2009 | Kortum et al. |
| 2009/0021651 A1 | 1/2009 | Pratt et al. |
| 2009/0031375 A1 | 1/2009 | Sullivan et al. |
| 2009/0044233 A1 | 2/2009 | Brandt et al. |
| 2009/0067591 A1 | 3/2009 | Belz et al. |
| 2009/0070696 A1 | 3/2009 | Belz et al. |
| 2009/0073321 A1 | 3/2009 | Sullivan et al. |
| 2009/0094654 A1 | 4/2009 | Sullivan et al. |
| 2009/0109050 A1 | 4/2009 | Sullivan et al. |
| 2009/0111656 A1 | 4/2009 | Sullivan et al. |
| 2009/0115904 A1 | 5/2009 | Sullivan et al. |
| 2009/0119181 A1 | 5/2009 | Pratt et al. |
| 2009/0125971 A1 | 5/2009 | Belz et al. |
| 2009/0157473 A1 | 6/2009 | Belz et al. |
| 2009/0157808 A1 | 6/2009 | Karaoguz et al. |
| 2009/0158369 A1 | 6/2009 | Van Vleck et al. |
| 2009/0158373 A1 | 6/2009 | Belz et al. |
| 2009/0161532 A1 | 6/2009 | Sullivan et al. |
| 2009/0180377 A1 | 7/2009 | Sullivan et al. |
| 2009/0180596 A1 | 7/2009 | Reynolds et al. |
| 2009/0185748 A1 | 7/2009 | Kortum et al. |
| 2009/0187955 A1 | 7/2009 | Sullivan et al. |
| 2009/0193143 A1 | 7/2009 | Karaoguz et al. |
| 2009/0210948 A1 | 8/2009 | Borghetti et al. |
| 2009/0222868 A1 | 9/2009 | Reynolds et al. |
| 2009/0245494 A1 | 10/2009 | Sullivan et al. |
| 2009/0249429 A1 | 10/2009 | Sullivan et al. |
| 2009/0254778 A1 | 10/2009 | Huang et al. |
| 2009/0284346 A1* | 11/2009 | Hormann .................... 340/5.71 |
| 2009/0288115 A1 | 11/2009 | Belz et al. |
| 2009/0312059 A1 | 12/2009 | Pratt et al. |
| 2009/0319607 A1 | 12/2009 | Belz et al. |
| 2010/0015999 A1 | 1/2010 | Belz et al. |
| 2010/0039214 A1 | 2/2010 | Pratt et al. |
| 2010/0039392 A1 | 2/2010 | Pratt et al. |
| 2010/0039393 A1 | 2/2010 | Pratt et al. |
| 2010/0040152 A1 | 2/2010 | Kortum et al. |
| 2010/0042827 A1 | 2/2010 | Pratt et al. |
| 2010/0050270 A1 | 2/2010 | Pratt et al. |
| 2010/0069012 A1 | 3/2010 | Sullivan et al. |
| 2010/0082712 A1 | 4/2010 | Pratt et al. |
| 2010/0088149 A1 | 4/2010 | Sullivan et al. |
| 2010/0104024 A1 | 4/2010 | Sullivan et al. |
| 2010/0113160 A1 | 5/2010 | Belz et al. |
| 2010/0115592 A1 | 5/2010 | Belz et al. |
| 2010/0115607 A1 | 5/2010 | Pratt et al. |
| 2010/0118748 A1 | 5/2010 | Pratt et al. |
| 2010/0119051 A1 | 5/2010 | Belz et al. |
| 2010/0121744 A1 | 5/2010 | Belz et al. |
| 2010/0122306 A1 | 5/2010 | Pratt et al. |
| 2010/0124905 A1 | 5/2010 | Pratt et al. |
| 2010/0134338 A1 | 6/2010 | Belz et al. |
| 2010/0138499 A1 | 6/2010 | Belz et al. |
| 2010/0138876 A1 | 6/2010 | Sullivan |
| 2010/0144368 A1 | 6/2010 | Sullivan et al. |
| 2010/0149982 A1 | 6/2010 | Pratt et al. |
| 2010/0150327 A1 | 6/2010 | Belz et al. |
| 2010/0153764 A1 | 6/2010 | Pratt et al. |
| 2010/0153995 A1 | 6/2010 | Belz et al. |
| 2010/0158533 A1 | 6/2010 | Belz et al. |
| 2010/0161801 A1 | 6/2010 | Belz et al. |
| 2010/0162331 A1 | 6/2010 | Belz et al. |
| 2010/0174572 A1 | 7/2010 | Joseph et al. |
| 2010/0178869 A1 | 7/2010 | Mauney et al. |
| 2010/0222031 A1* | 9/2010 | Carolan et al. ............. 455/414.1 |
| 2010/0235872 A1 | 9/2010 | Sullivan et al. |
| 2010/0275236 A1 | 10/2010 | Kortum et al. |
| 2010/0275237 A1 | 10/2010 | Pratt et al. |
| 2010/0289685 A1 | 11/2010 | Pratt et al. |
| 2010/0289954 A1 | 11/2010 | Sullivan et al. |

(56) References Cited

U.S. PATENT DOCUMENTS

| | | |
|---|---|---|
| 2010/0299693 A1 | 11/2010 | Sullivan et al. |
| 2010/0302057 A1 | 12/2010 | Pratt et al. |
| 2010/0302058 A1 | 12/2010 | Belz et al. |
| 2011/0003587 A1 | 1/2011 | Belz et al. |
| 2011/0010745 A1 | 1/2011 | Belz et al. |
| 2011/0010746 A1 | 1/2011 | Howarter et al. |
| 2011/0029887 A1 | 2/2011 | Pearson et al. |
| 2011/0037574 A1 | 2/2011 | Pratt et al. |
| 2011/0037611 A1 | 2/2011 | Van Vleck et al. |
| 2011/0037637 A1 | 2/2011 | Van Vleck et al. |
| 2011/0075727 A1 | 3/2011 | Van Vleck et al. |
| 2011/0090085 A1 | 4/2011 | Belz et al. |
| 2011/0093876 A1 | 4/2011 | Belz et al. |
| 2011/0093908 A1 | 4/2011 | Van Vleck et al. |
| 2011/0095873 A1 | 4/2011 | Pratt et al. |
| 2011/0109490 A1 | 5/2011 | Belz et al. |
| 2011/0113459 A1 | 5/2011 | Crowe et al. |
| 2011/0114716 A1 | 5/2011 | Pratt |
| 2011/0115664 A1 | 5/2011 | Belz et al. |
| 2011/0124316 A1 | 5/2011 | Mauney et al. |
| 2011/0131605 A1 | 6/2011 | Pratt |
| 2011/0159861 A1 | 6/2011 | Pratt et al. |
| 2011/0161423 A1 | 6/2011 | Pratt et al. |

* cited by examiner

DEVICE CONTROL BY MULTIPLE REMOTE CONTROLS

BACKGROUND

1. Field of the Disclosure

The present disclosure relates to remote-controlled devices and, more particularly, to authorizing remote controls to operate a remote-controlled device.

2. Description of the Related Art

Remote-controlled devices provide convenient operation of equipment from a distance. Many consumer electronic devices are equipped with remote control features. Universal remote-controlled devices, may be configured to control different pieces of equipment.

DESCRIPTION OF THE EXEMPLARY EMBODIMENTS

Figure 1:
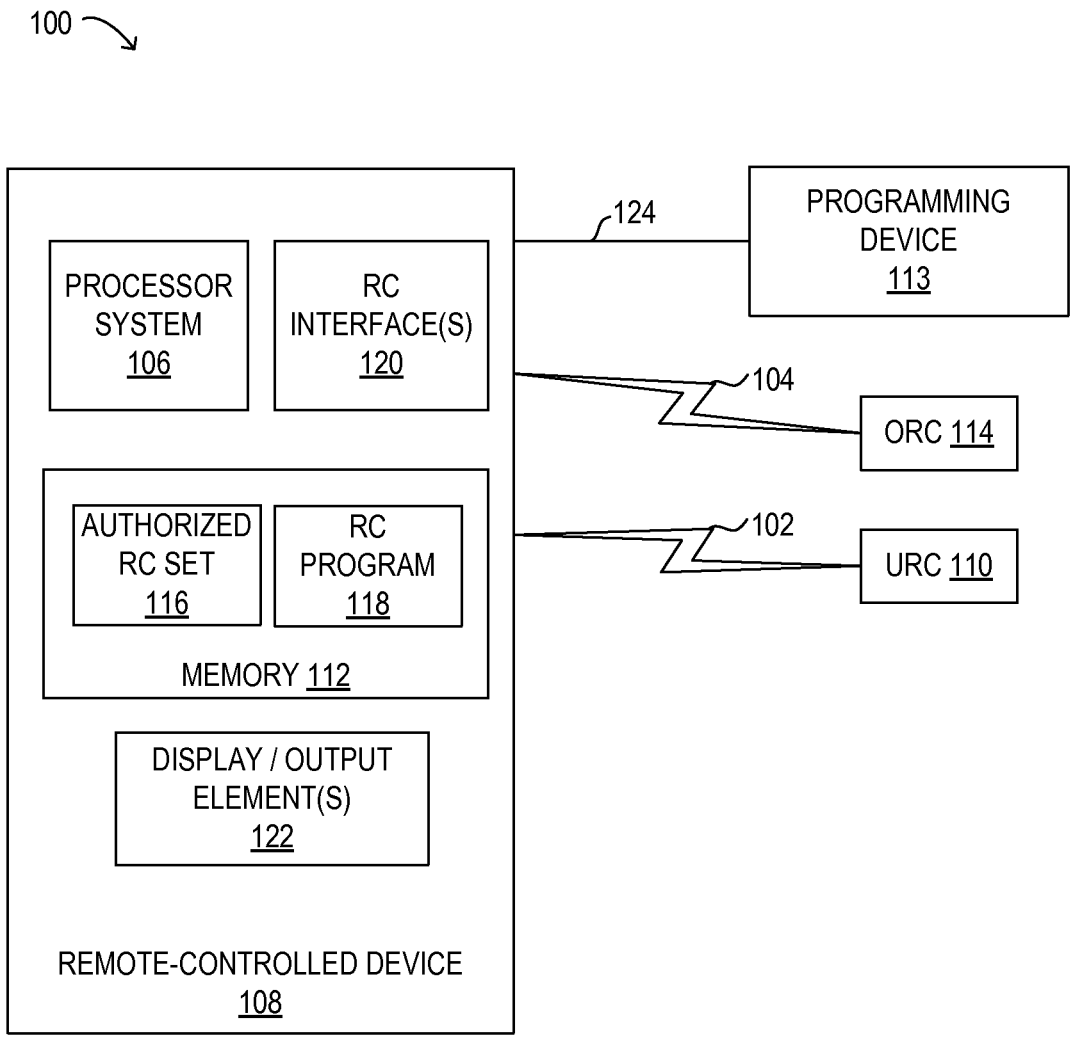
FIG. 1 a block diagram of selected elements of an embodiment of a universal remote control system.

In one aspect, a disclosed method for operating a remote-controlled device (RCD) includes receiving an instruction to operate the RCD from a remote control (RC), wherein the instruction includes an RC code corresponding to the RC and a control code, and responsive to determining that the RC code indicates authorization to control the RCD, performing an RCD operation corresponding to the control code. The method operation of determining that the RC code indicates authorization to control the RCD may further include comparing the RC code with a stored set of RC codes indicating a respective set of RCs that are authorized to control the RCD.

In certain embodiments, responsive to receiving user input, the method further includes initiating an authorization mode for determining which RC codes are included in the stored set of RC codes. The method may further include receiving a new RC code corresponding to a new RC, and adding the new RC code to the stored set of RC codes, wherein the new RC is authorized to control the RCD. The method may also include deleting an RC code from the stored set of RC codes, wherein an RC corresponding to the deleted RC code is no longer authorized to control the RCD. The method may still further include outputting a user indication that the authorization mode is active. The stored set of RC codes may be stored on a memory device included in the RCD. An empty set of RC codes may result in the RCD being non-responsive to instructions received from any RC.

In another aspect, an RCD includes a processor, a wireless receiver to receive wirelessly transmitted instructions, and memory media accessible to the processor. The memory media may include instructions executable by the processor to receive an instruction to operate the RCD from an RC, wherein the instruction includes an RC code unique to the RC and a control code. The memory media may further include instructions executable to compare the RC code with a stored set of RC codes indicating a respective set of RCs that are authorized to control the RCD, and responsive to finding a match for the RC code in the stored set of RC codes, execute an RCD operation corresponding to the control code.

In particular embodiments, the RC may be a universal remote control (URC), while the URC may be configured to send instructions to more than one RCD. The stored set of RC codes may indicate a set of RCs including the URC. The stored set of RC codes may be stored in the memory media. The instructions may further include processor executable instructions to receive a new RC code corresponding to a new RC device, and add the new RC code to the stored set of RC codes. The instructions may still further include processor executable instructions to delete one of the RC codes in the stored set of RC codes.

In a further aspect, a disclosed computer-readable memory media includes executable instructions for operating an RCD. The instructions may be executable to receive an instruction to operate the RCD from an RC, wherein the instruction includes an RC code corresponding to the RC and a control code and identify the RC code and the control code. Responsive to finding a match for the RC code in a stored set of RC codes indicating a respective set of RCs that are authorized to control the RCD, the instructions may also be executable to execute an RCD operation corresponding to the control code.

In certain embodiments, the memory media may include instructions executable to receive first input for initiating an authorization mode on the RCD, and receive second input for terminating the authorization mode. The memory media may also include instructions executable to receive a new RC code corresponding to a new RC, and add the new RC code to the stored set of RC codes to authorize the new RC to control the RCD. The new RC code may be received from the new RC. The new RC code may be received from a programming device. The first input and the second input may both be user inputs. The first input and the second input may be received from a programming device. The memory media may still further include instructions executable to delete an RC code from the stored set of RC codes to prohibit an RC corresponding to the deleted RC code from controlling the RCD.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Referring now to FIG. 1, a block diagram of selected elements of an embodiment of remote-controlled system 100 are depicted. System 100 illustrates devices, interfaces and information that may be processed to configure RCD 108 to use at least one RC. In system 100, RCD 108 represents any of a number of different types of devices that are remote-controlled, such as media players, televisions, or client-premises equipment (CPE) for multimedia content distribution networks (MCDNs), among others. System 100 is also shown including two particular RCs, original remote control (ORC) 114 and URC 110, along with programming device 113.

In FIG. 1, ORC 114 is depicted communicating with RCD 108 via communication link 104. Similarly, URC 110 is shown communicating with RCD 108 via communication link 102. Communication links 102 and 104 may be wireless or mechanically connected interfaces. Programming device 113 may communicate with RCD 108 via communication link 124, which may be removably coupled to RCD 108.

As shown in FIG. 1, RCD 108 includes numerous elements, and may include additional elements (not shown in FIG. 1) in various embodiments. RCD 108 is shown including processor system 106, RC interface 120, memory 112, and display/output elements 122. Memory 112 is depicted in FIG. 1 including authorized RC set 116 and RC program 118. Accordingly, RCD 108 may comprise elements configured to function as an embodiment of a computing device. RCD 108 may further include at least one shared bus (not shown in FIG. 1) for interconnectivity among internal elements, such as those depicted in FIG. 1.

The RCs shown in FIG. 1 include ORC 114 and URC 110 and represent devices that respond to user input to control operation of RCD 108. ORC 114 may represent original equipment associated with RCD 108 that may be provided by a manufacturer of RCD 108. Thus, ORC 114 may be configured for exclusive use with RCD 108. On the other hand, URC 110 may be provided by a third-party for use with a number of different RCDs, such as RCD 108. That is, different control elements (not shown in FIG. 1) on URC 110 may be programmable to generate instructions to control different RCDs. Although two RCs are shown in FIG. 1 for clarity, RCD 108 may be configured to respond to a number of different RCs.

Processor system 106 may represent at least one processing unit and may further include internal memory, such as a cache for storing processor executable instructions. In certain embodiments, processor system 106 serves as a main controller for RCD 108. In various embodiments, processor system 106 is operable to perform remote control operations, as described herein.

In FIG. 1, RC interface(s) 120 may represent a communications transceiver providing an interface for any of a number of communication links. In certain embodiments, RC interface(s) 120 supports wireless communication links, such as infrared (IR), radio-frequency (RF), and audio, among others. RC interface(s) 120 may further support mechanically connected communication links to RCs, such as galvanically wired connections, and may accordingly include a physical adapter or receptacle for receiving such connections. In one embodiment, RC interface(s) 120 transforms a received signal into an instruction for operating RCD 108, by which an RC may operate RCD 108.

Also in FIG. 1, memory 112 encompasses persistent and volatile media, fixed and removable media, magnetic and semiconductor media, or a combination thereof. Memory 112 is operable to store instructions, data, or both. Memory 112 as shown includes data, which may be in the form of sets or sequences of instructions, namely, authorized RC set 116 and RC program 118. Authorized RC set 116 may represent information indicating a set of RCs that are authorized to control the RCD. RC program 118 may include processor executable instructions to receive commands from RCs and execute the commands, as will be described in detail herein.

RCD 108, as depicted in FIG. 1, further includes display/output element(s) 122, which may represent various types of components for interacting with a user of RCD 108. An output element included in display/output element(s) 122 may represent a device for providing signals or indications to the user, such as loudspeakers for generating audio signals. A display element included in display/output element(s) 122 may include a display device, which may be implemented as a liquid crystal display screen, a computer monitor, a television, a touch screen device, or the like. The display element may comply with a display standard for the corresponding type of display. Standards for computer monitors include analog standards such as video graphics array (VGA), extended graphics array (XGA), etc., or digital standards such as digital video interface (DVI), high definition multimedia interface (HDMI), among others. A television display may comply with standards such as National Television System Committee (NTSC), Phase Alternating Line (PAL), or another suitable standard.

In FIG. 1, programming device 113 may represent a special-purpose device configured to program memory 112. Programming device 113 may thus be configured to modify authorized RC set 116 and/or RC program 118, or to load these elements in memory 112. In certain embodiments, programming device 113 is configured to initiate an authorization mode in RCD 108, during which authorized RC set 116 may be edited. In some embodiments, programming device 113 may further be used to reset memory 112 to a default state. In one embodiment, programming device 113 is located at a remote location (not shown in FIG. 1) from RCD 108, while communication link 124 may be a network interface In one embodiment, RCD 108 may receive an instruction from an RC, such as URC 110. The instruction may be received via communication link 102 by RC interface(s) 120. A method to process the instruction, as described herein, may be embodied in RC program 118, which may be executed by processor system 106. The instruction may include an RC code corresponding to URC 110 and a control code. The control code may represent a specific operation for RCD 108.

RC program 118 may compare the received RC code with a stored set of RC codes in authorized RC set 116. Authorized RC set 116 may store a set of RC codes indicating a respective set of RCs, such as URC 110, that are authorized to control RCD 108. If the received RC code does not match an RC code in authorized RC set 116, then RC program 118 may deny the instruction, or simply remain non-responsive.

If the received RC code does match an RC code in authorized RC set 116, then RC program 118 may interpret the control code as a specific operation for RCD 108 and cause RCD 108 to perform the specific operation. RCD 108 may further display or output an indication of the specific operation or whether the received RC code was authorized using display/output element(s) 122.

Further, RCD 108 may receive input for initiating an authorization mode. In certain embodiments, input may be user input from an RC, such as ORC 114 or URC 110. In other embodiments, the input may be received from programming device 113. During authorization mode, modifications to authorized RC set 116 may be allowed. The modifications may include deletion of an RC code stored in authorized RC set 116 and addition of a new RC code to authorized RC set 116. In one embodiment, authorized RC set 116 may be completely cleared of RC codes, such that no RC is authorized to control RCD 108. Authorized RC set 116 may be restored to a default state that authorizes ORC 114 to control RCD 108. If a particular RC code is deleted from authorized RC set 116, then the corresponding RC will be prohibited from controlling RCD 108. In particular embodiments, authorized RC set 116 may contain protected, i.e., read-only, entries for RC codes that cannot be deleted.

Figure 2:
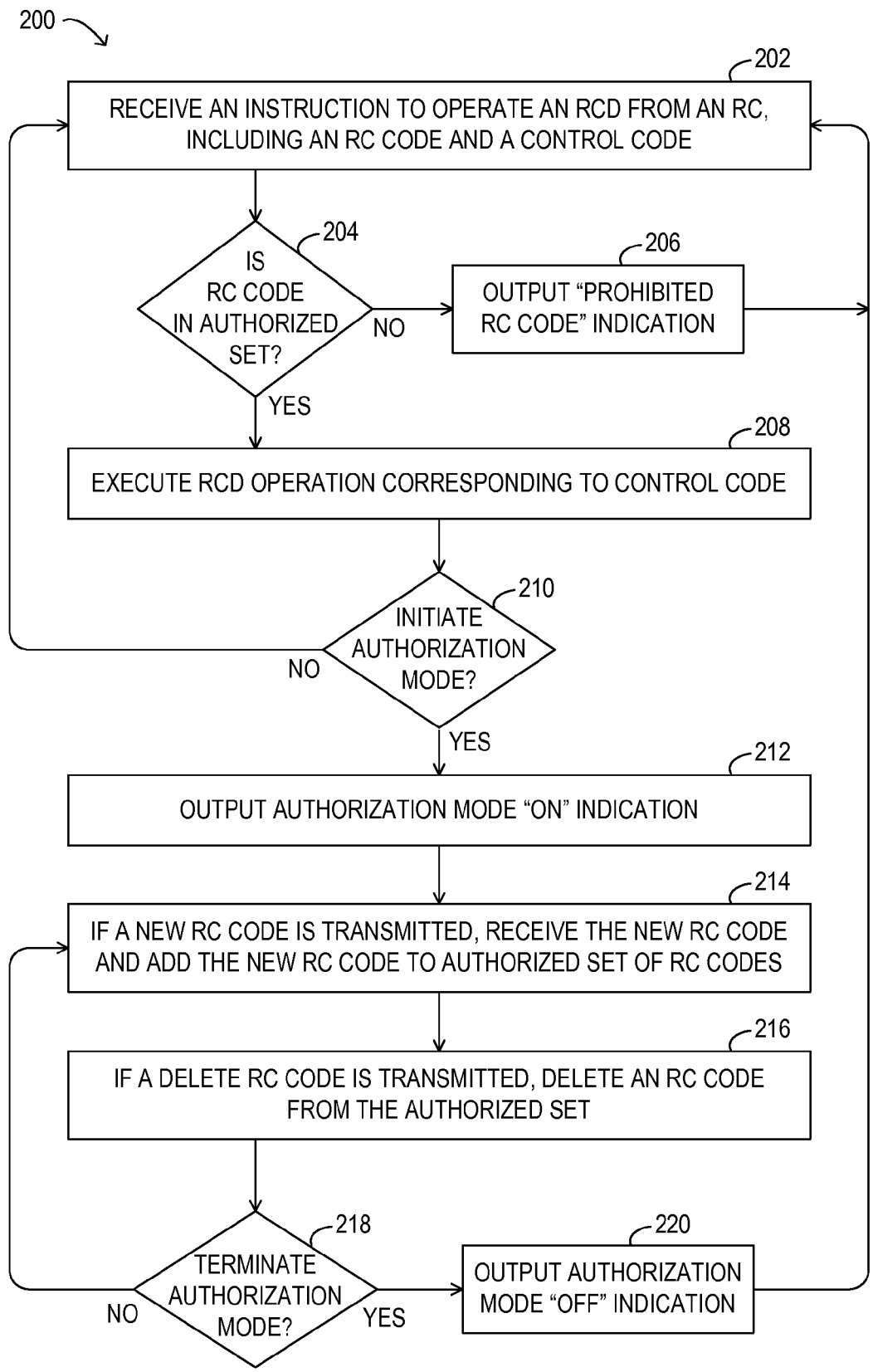
FIG. 2 illustrates an embodiment of a method for programming a universal remote control.

Turning now to FIG. 2, an embodiment of method 200 for remotely controlling an RCD is illustrated. In one embodiment, method 200 is performed by RC program 118 executing on RCD 108. It is noted that certain operations described in method 200 may be optional or may be rearranged in different embodiments. For example in certain embodiments, operations 210 through 220 may be executed as a separate authorization mode method in parallel with other operations.

Method 200 may begin by receiving an instruction to operate an RCD from an RC, including an RC code and a control code (operation 202). The instruction may be received in the form of digital codes. The RC code may uniquely correspond to the particular RC sending the instruction, while the control code may correspond to a particular operation on the RCD. In certain embodiments, the RC code may simply correspond to a particular type of RC, such that any instance of the RC type generates the same RC code. The RCD may be configured to receive and interpret the codes in the instruction, which may be further encoded or encrypted for security. The instruction may be wirelessly received at an RC interface of the RCD.

In operation 202, the RC may send the instruction in response to user input received at a control element of the RC, such as a physical or virtual button. The activation of the control element by the user may generate the control code, while the RC code may be solely associated with the RC itself. In various embodiments, the instruction may include additional information generated by the RC along with the RC code and the control code.

Then, a decision may be made whether the RC code is in an authorized set of RC codes (operation 204). Additional operations may be associated with the decision in operation 204 (see FIG. 3). If the result of the decision in operation 204 is NO, then a "prohibited RC code" indication may be output (operation 206). After operation 206, method 200 may return to operation 202 and wait for another received instruction.

If the result of the decision in operation 204 is YES, then an RCD operation corresponding to the control code may be executed (operation 208). The RCD operation may be executed by the RCD and may correspond to a device function of the RCD. The RCD may output or display an "authorized RC code" indication in association with performing the RCD operation.

Method 200 may continue by making a decision whether an authorization mode should be initiated (operation 210). The decision in operation 210 may be made in response to receiving an instruction to enter authorization mode. In certain embodiments, the decision in operation 210 is made in response to user input. If the result of the decision in operation 210 is NO, then method 200 may return to operation 202 and wait for another received instruction.

If the result of the decision in operation 210 is YES, then an indication of authorization mode "on" may be output (operation 212). If a new RC code is transmitted, then the new RC code may be received and the new RC code may be added to the authorized set of RC codes (operation 214). The new RC code may be transmitted from an RC or a programming device. An additional instruction to add the new RC code in authorization mode may be received. If the new RC code matches an existing RC code in the authorized set of RC codes, a message indicating a duplicate RC code may be returned. If a delete RC code is transmitted, an RC code may be deleted from the authorized set of RC codes (operation 216). The delete RC code may be transmitted from an RC or a programming device. An additional instruction to delete the delete RC code in authorization mode may be received. If the deleted RC code does not match an existing RC code in the authorized set of RC codes, a message indicating a delete RC code error may be returned.

Method 200 may proceed by making a decision whether the authorization mode should be terminated (operation 218). The termination of authorization mode may be in response to a received instruction or user input. If the result of the decision in operation 218 is NO, then method 200 may return to operation 202 and wait for additional operations in authorization mode. If the result of the decision in operation 218 is YES, then an indication of authorization mode "off" may be output (operation 220). The authorization mode may be terminated on the RCD and method 200 may return to operation 202 and wait for another received instruction.

Figure 3:
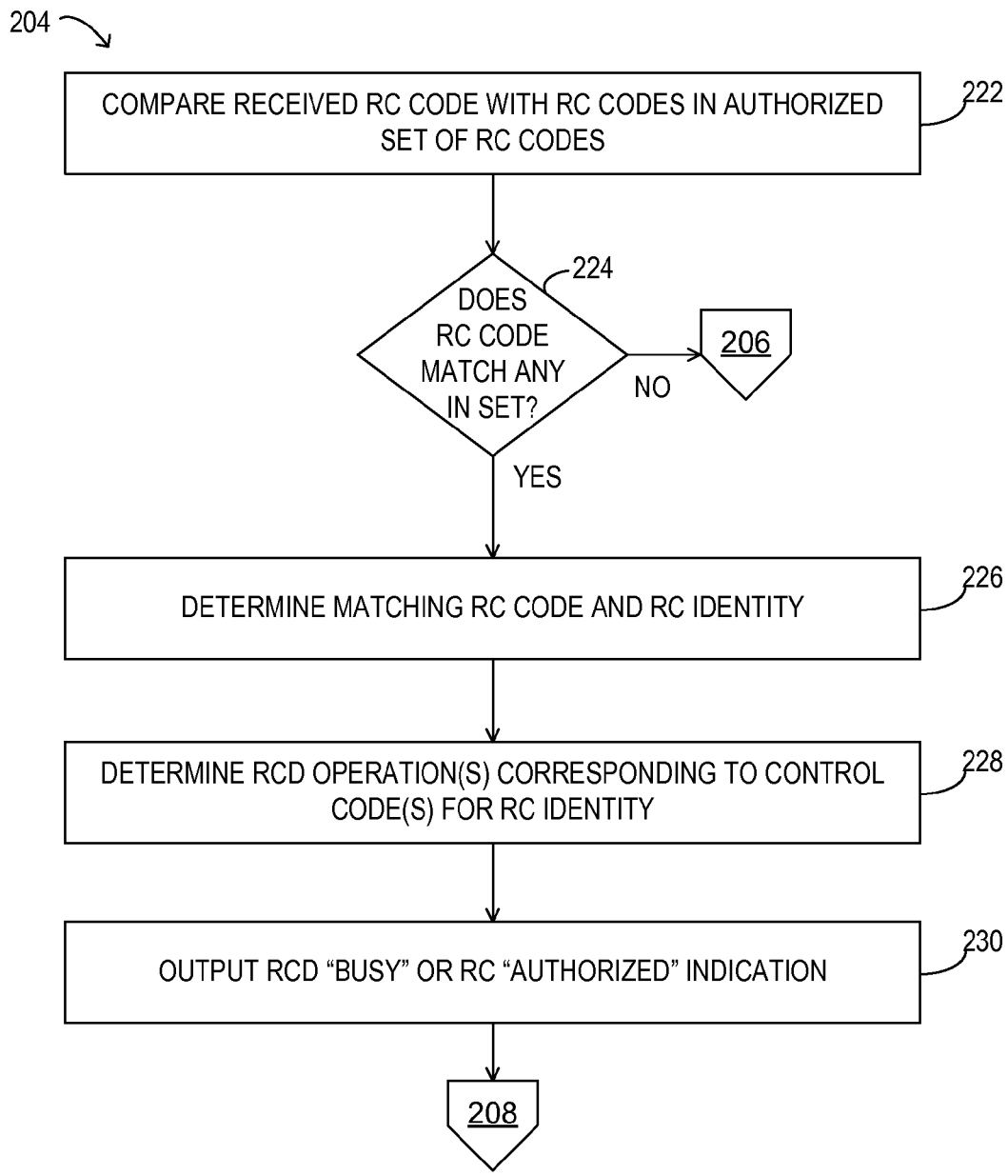
FIG. 3 illustrates an embodiment of a method for programming a universal remote control.

Turning now to FIG. 3, an embodiment of method 204 for remotely controlling an RCD is illustrated. Method 204 corresponds to one exemplary embodiment of operation 204 (see FIG. 2). In one embodiment, method 204 is performed by RC program 118 executing on RCD 108. It is noted that certain operations described in method 204 may be optional or may be rearranged in different embodiments.

Method 204 may begin by comparing a received RC code with RC codes stored in an authorized set of RC codes (operation 222). Method 204 may proceed by making a decision whether the RC code matches any RC codes in the authorized set of RC codes (operation 224). If the result of the decision in operation 224 is NO, then method 204 may continue to operation 206 (see FIG. 2).

If the result of the decision in operation 224 is YES, then the matching RC code may be determined along with an RC identity (operation 226). The RC identity may correspond to the RC sending the instruction in operation 202 (see FIG. 2). Next, the RCD operation(s) corresponding to control code(s) for the RC identity may be determined (operation 228). The RCD operations may represent the operations executed by the RCD when a corresponding control code is received. Further, the RCD may output a "busy" or "authorized" indication (operation 230). The "busy" or "authorized" indication may persist until the RCD operation has been performed. Method 204 may then continue to operation 208 (see FIG. 2).

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A remote control method comprising:
   receiving, from a first remote control, an instruction to operate a remote-controlled media player, wherein the instruction includes a first remote control code identifying the first remote control and an operation code corresponding to a first operation associated with the remote controlled media player;
   comparing the first remote control code with a stored set of remote control codes indicating a respective set of remote controls that are authorized to control the remote-controlled media player;
   responsive to determining that the first remote control code indicates that the first remote control is authorized to control the remote-controlled media player, sending the operation code to the remote controlled media player for execution;
   after sending the operation code, determining whether to initiate an authorization mode; and
   responsive to initiating the authorization mode, adding a new remote control code to the stored set of remote control codes responsive to detecting the new remote control code;
   responsive to receiving a delete remote code instruction identifying a remote control code, removing the identified remote control code from the stored set of remote control codes;
   wherein the remote control corresponding to a deleted remote control code is no longer authorized to control the remote-controlled media player and wherein a number of remote control codes in the stored set of remote control codes after execution of the delete remote code instruction is less than a number of remote control codes in the stored set of remote control codes before execution of the delete remote code instruction.

2. The method of claim 1, further comprising:
   responsive to receiving a reset instruction, restoring the stored set of remote control codes to an original state including a single authorized remote control code corresponding to an original remote control.

3. The method of claim 1, further comprising:
outputting a user indication that the authorization mode is active.

4. The method of claim 1, wherein the stored set of remote control codes is stored on a memory device included in the remote-controlled media player.

5. The method of claim 1, wherein an empty set of remote control codes results in the remote-controlled media player being non-responsive to instructions received from any remote control.

6. A remote-controlled media player, comprising:
a processor;
a wireless receiver to receive wirelessly transmitted instructions; and
memory storage media accessible to the processor, including processor executable instructions that, when executed by the processor, cause the processor to perform operations comprising:
receiving a wirelessly transmitted instruction to operate the remote-controlled media player from a first remote control, wherein the wirelessly transmitted instruction includes a first remote control code unique to the first remote control and an operation code corresponding to an operation executable by the remote-controlled media player;
comparing the first remote control code with a stored set of remote control codes indicating a respective set of remote controls that are authorized to control the remote-controlled media player; and
responsive to finding a match for the first remote control code in the stored set of remote control codes: performing the operation indicated by the operation code;
after performing the operation, determining whether an authorization mode has been initiated;
responsive to detecting initiation of the authorization mode:
adding a second remote control code to the stored set of remote control codes responsive to detecting the second remote control code; and
terminating the authorization model; and
responsive to receiving a delete remote code instruction identifying a remote control code, removing the identified remote control code from the stored set of remote control codes;
wherein the remote control corresponding to a deleted remote control code is no longer authorized to control the remote-controlled media player and wherein a number of recognized remote control codes in the stored set of remote control codes after execution of the delete remote code instruction is less than a number of recognized remote control codes in the stored set of remote control codes before execution of the delete remote code instruction.

7. The remote-controlled media player of claim 6, wherein the first remote control is a universal remote control, and wherein the universal remote control is configured to send the wirelessly transmitted instructions to more than one remote-controlled media player.

8. The remote-controlled media player of claim 7, wherein the stored set of remote control codes are stored in the memory media.

9. A computer-readable memory device, including processor executable instructions that, when executed by a processor, cause the processor to perform processor operations comprising:
receiving a wirelessly transmitted instruction to operate a remote-controlled media player from a first remote control, wherein the wirelessly transmitted instruction includes a first remote control code unique to the first remote control and an operation code corresponding to an operation executable by the remote-controlled media player;
comparing the first remote control code with a stored set of remote control codes indicating a respective set of remote controls that are authorized to control the remote-controlled media player; and
responsive to finding a match for the first remote control code in the stored set of remote control codes: performing the operation corresponding to the operation code;
after performing the operation, determining whether an authorization mode has been initiated;
responsive to detecting initiation of the authorization mode, adding a second remote control code to the stored set of remote control codes responsive to detecting the second remote control code; and
responsive to receiving a delete remote code instruction identifying a remote control code, removing the identified remote control code from the stored set of remote control codes;
wherein the remote control corresponding to a deleted remote control code is no longer authorized to control the remote-controlled media player and wherein a number of remote control codes in the stored set of remote control codes after execution of the delete remote code instruction is less than a number of remote control codes in the stored set of remote control codes before execution of the delete remote code instruction.

10. The memory device of claim 9, wherein the second remote control code is received from a new second remote control.

11. The memory device of claim 9, wherein the second remote control code is received from a programming device.

12. The memory device of claim 9, wherein the authorization mode is initiated in response to user input.

13. The memory device of claim 9, wherein the instruction is received from a programming device.

14. The memory device of claim 9, wherein the processor operations include:
deleting a remote control code from the stored set of remote control codes to prohibit an remote control corresponding to the deleted remote control code from controlling the remote-controlled media player.

* * * * *